(12) United States Patent
Lineman et al.

(10) Patent No.: US 9,475,720 B2
(45) Date of Patent: Oct. 25, 2016

(54) SYSTEM AND METHOD FOR RESTRICTING INWARD HYDROGEN PERMEATION IN A GLASS MANUFACTURING SYSTEM

(71) Applicants: David Myron Lineman, Painted Post, NY (US); Martin Herbert Goller, Campbell, NY (US); Steven Robert Moshier, Horseheads, NY (US)

(72) Inventors: David Myron Lineman, Painted Post, NY (US); Martin Herbert Goller, Campbell, NY (US); Steven Robert Moshier, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 536 days.

(21) Appl. No.: 13/685,217

(22) Filed: Nov. 26, 2012

(65) Prior Publication Data
US 2014/0144184 A1 May 29, 2014

(51) Int. Cl.
  C03B 5/18 (2006.01)
  C03B 5/187 (2006.01)

(52) U.S. Cl.
  CPC .................................. C03B 5/1875 (2013.01)

(58) Field of Classification Search
  CPC ...................................................... C03B 5/187
  See application file for complete search history.

(56) References Cited

U.S. PATENT DOCUMENTS

| | | | | |
|---|---|---|---|---|
| 2,520,577 A * | 8/1950 | Tooley | | 65/178 |
| 2,641,454 A * | 6/1953 | Labino | | 65/134.7 |
| 3,883,340 A * | 5/1975 | French et al. | | 65/135.3 |
| 4,983,198 A * | 1/1991 | Ogino | | C03B 5/0336 |
| | | | | 65/134.1 |
| 5,785,726 A | 7/1998 | Dorfeld et al. | | 65/134.1 |
| 5,824,127 A | 10/1998 | Bange et al. | | 65/90 |
| 6,128,924 A | 10/2000 | Bange et al. | | 65/90 |
| 7,000,432 B2 | 2/2006 | Itoh et al. | | 65/134.2 |
| 7,032,412 B2 | 4/2006 | Dorfeld et al. | | 65/53 |
| 7,338,714 B2 | 3/2008 | Ott et al. | | 428/433 |
| 7,475,568 B2 | 1/2009 | Bookbinder et al. | | 65/134.9 |
| 7,628,037 B2 | 12/2009 | Lautenschlaeger et al. | 65/29.12 |
| 7,628,038 B2 | 12/2009 | DeAngelis et al. | | 65/134.1 |
| 7,628,039 B2 | 12/2009 | DeAngelis et al. | | 65/157 |
| 7,648,732 B2 | 1/2010 | Ott et al. | | 427/193 |
| 8,114,188 B1 | 2/2012 | Goller et al. | | 75/633 |
| 8,127,572 B2 | 3/2012 | Dorfeld et al. | | 65/134.1 |
| 2001/0039812 A1 | 11/2001 | Romer et al. | | 65/134.1 |
| 2003/0037572 A1* | 2/2003 | Dick | | C03B 5/16 |
| | | | | 65/134.9 |
| 2006/0242995 A1 | 11/2006 | Bookbinder et al. | | 65/134.1 |
| 2006/0242996 A1 | 11/2006 | DeAngelis | | 65/134.1 |

(Continued)

FOREIGN PATENT DOCUMENTS

| | | | | |
|---|---|---|---|---|
| JP | 2012-116693 A | 6/2012 | | |
| JP | 2012121740 | 6/2012 | | C03B 5/42 |
| JP | 2012121779 | 6/2012 | | C03B 5/42 |

OTHER PUBLICATIONS

PCT form—Notification of Transmittal of the International Search Report and The Written Opinion of the International Searching Authority or the declaration. Dated Mar. 10, 2014.

*Primary Examiner* — Angela Ortiz
*Assistant Examiner* — Cynthia Szewczyk
(74) *Attorney, Agent, or Firm* — Kevin M. Able

(57) ABSTRACT

Hydrogen may permeate into an interior space of an article in response to molten glass being in contact with the outer surface of the article. The permeation may be restricted by having a fluid in a length of the interior space. The fluid may be in contact with the inner surface of the article, the fluid may fill at least about 33% of the volume of the length of the interior space, and the fluid may provide a predetermined partial pressure of hydrogen. Features may be provided for causing the fluid to flow within the interior space.

5 Claims, 3 Drawing Sheets

(56) References Cited

U.S. PATENT DOCUMENTS

| | | | |
|---|---|---|---|
| 2007/0149380 A1 | 6/2007 | Dorfeld et al. | 501/55 |
| 2011/0138858 A1 | 6/2011 | Dorfeld et al. | 65/29.15 |
| 2011/0205836 A1* | 8/2011 | Lentes et al. | 366/325.92 |
| 2012/0073326 A1 | 3/2012 | Dorfeld et al. | |

\* cited by examiner

SYSTEM AND METHOD FOR RESTRICTING INWARD HYDROGEN PERMEATION IN A GLASS MANUFACTURING SYSTEM

BACKGROUND

The disclosure relates generally to producing glass products and more particularly to restricting hydrogen permeation through the wall of an article which may be used in producing the glass products.

Gaseous glass defects in the form of oxygen-rich blisters may be introduced into glass while it is being manufactured. During manufacturing, these blisters may form at an interface between the molten glass and an adjacent platinum wall. The blisters may form in response to hydrogen permeating through the platinum wall. Therefore, the blistering may be referred to as hydrogen permeation blistering.

No admission is made that any reference cited herein constitutes prior art. Applicant expressly reserves the right to challenge the accuracy and pertinency of any cited documents.

SUMMARY

An embodiment of the disclosure relates to a method for processing molten glass, comprising having face-to-face contact between the molten glass and an outer surface of an article, and restricting any inward hydrogen permeation through the article. The article may comprise noble metal, and an inner surface of the article may extend around an interior space of the article. The restricting of any inward hydrogen permeation through the article may comprise having media in the interior space, wherein the media is effective for restricting any inward hydrogen permeation through the article.

In one example, the restricting of any inward hydrogen permeation through the article may comprise having fluid in the interior space, wherein the fluid is in face-to-face contact with the inner surface of the article, and the fluid is for restricting any inward hydrogen permeation through the article. In one aspect, the fluid may fill the interior space of the article to at least the level of the molten glass that is outside of the article. In this and/or another aspect, the fluid may fill at least about 33% of a volume of a length of the interior space. The fluid in the interior space may restrict any inward hydrogen permeation through the article as a result of the fluid providing a partial pressure of hydrogen at the face-to-face contact between the inner surface of the article and the fluid, and that partial pressure may be at least about the same as any partial pressure of hydrogen provided by the molten glass at the face-to-face contact between the molten glass and the outer surface of the article. The fluid in the interior space of the article may comprise be a liquid such as, but not limited to, molten glass. The interior space may have a dimension (e.g., a maximal crosswise dimension) that extends crosswise to the length, wherein the crosswise dimension is defined between opposite portions of the inner surface of the article, and the crosswise dimension may be smaller than the length. The crosswise dimension may be a diameter defined between diametrically opposite portions of the inner surface of the article, and the diameter may be smaller than the length.

In another example, the restricting of any inward hydrogen permeation through the article may comprise causing fluid to flow in the interior space, so that the fluid is in face-to-face contact with the inner surface of the article, wherein the fluid is for restricting any inward hydrogen permeation through the article. More specifically, the fluid may be circulated in the interior space, and the fluid may have a partial pressure of hydrogen that may be at least about the same as any partial pressure of hydrogen provided by the molten glass at the face-to-face contact between the outer surface of the article and the molten glass. The fluid flowing within the interior space of the article may be gas.

In one example, the molten glass may be contained in a stirring chamber. The article may be any suitable device such as, but not limited to, a tubular stirrer that may have one or more stirring elements extending outwardly therefrom. The molten glass in the stirring chamber may be stirred with the stirrer.

An additional embodiment of the disclosure relates to an apparatus for being in contact with molten glass, wherein the apparatus comprises an article comprising noble metal, the article has opposite inner and outer surfaces, the outer surface is for being in face-to-face contact with the molten glass, and the inner surface extends around an interior space of the article; and a glass filling may be in face-to-face contact with the inner surface of the article. The glass filling may fill at least about 33% of a volume of a length of the interior space. The length of the interior space may have a crosswise dimension (e.g., a maximal crosswise dimension) defined between opposite portions of the inner surface of the article, and the crosswise dimension may be smaller than the length. As a more specific example, the length of the interior space may have a diameter defined between diametrically opposite portions of the inner surface of the article, and the diameter may be smaller than the length. The article may be any suitable device such as, but not limited to, a tubular stir shaft that may have stirring element(s) extending outwardly therefrom.

In another embodiment related to an apparatus for being in contact with molten glass, the apparatus may comprise an article having an outer surface for being in face-to-face contact with the molten glass, and a conditioning unit in fluid communication with an interior space of the article, for causing fluid to flow within the interior space, wherein the fluid is for restricting any inward hydrogen permeation through a wall of the article. The article may be any suitable device such as, but not limited to, a tubular stir shaft that may have stirring element(s) extending outwardly therefrom.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
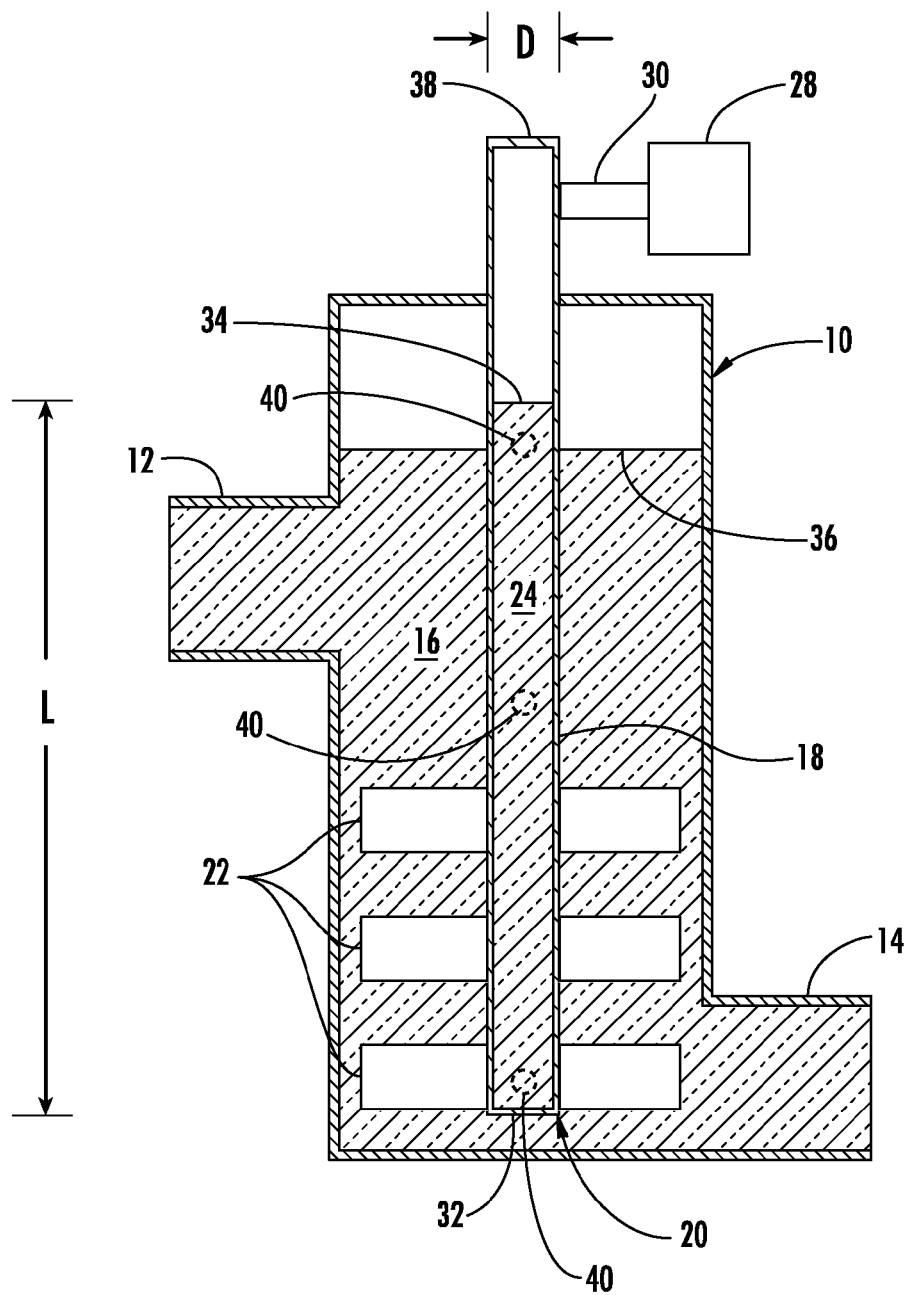
FIG. 1 is a schematic, side cross-sectional view of a stir chamber and a few other features of a glass manufacturing system, in accordance with an embodiment.

Various embodiments will now be described more fully with reference to the accompanying drawings. The same reference numerals may be used throughout the drawings to refer to the same or like parts. However, aspects may be embodied in many different forms and should not be construed as limited to the embodiments set forth herein.

FIG. 1 schematically illustrates selected features of a glass manufacturing system that is described in the following in accordance with an embodiment. The system may include a conventional stirring chamber 10 (e.g., mixing vessel) in which molten glass 16 is stirred, and the stirring chamber may be associated in a conventional manner with other conventional features of the system. For example, a conventional melting vessel (not shown) may be positioned at an upstream end of the system. A conventional finer tube (not shown) may be positioned downstream from, and may be conventionally connected to or associated with, the melting vessel. The stirring chamber 10 may be positioned downstream from, and may be conventionally connected to or associated with, the finer tube. A conventional delivery vessel (not shown) may be positioned downstream from, and may be conventionally connected to or associated with, the stirring chamber. A forming vessel (not shown) or other suitable feature of the manufacturing system may be positioned downstream from, and may be conventionally connected to or associated with, the delivery vessel.

The stirring chamber 10 may include an inlet 12 and outlet 14 by way of which the interior of the stirring chamber may be in fluid communication with the finer tube and the delivery vessel, respectively. Glass sheets may be made in the glass manufacturing system, for example in the manner described in U.S. Pat. No. 7,628,038, the entire disclosure of which is incorporated herein by reference. Alternatively, the glass manufacturing system may be configured for forming any other suitable types of glass articles.

One aspect of this disclosure is the provision of methods, systems and apparatus that seek to restrict any hydrogen permeation blistering associated with a noble metal article such as, but not limited to, a tubular stir shaft 18 having an outer surface for being in face-to-face contact with the molten glass 16 being processed within the glass manufacturing system. In this regard and for example, the stir shaft 18 may be part of a stirrer 20 for stirring molten glass 16 being within the interior of the stirring chamber 10. The stirrer 20 may optionally further include one or more stirring elements 22, such as blades or any other suitable features, that may be fixedly connected to and extend outwardly from the lower end of the tubular stir shaft 18 that is submersed in the molten glass 16 within the stirring chamber 10. The molten glass 16 may be formed and supplied to the interior of the stirring chamber 10 in a conventional manner.

In one aspect of this disclosure and as will be discussed in greater detail below, any inward hydrogen permeation from the molten glass 16 through the sidewall of the tubular stir shaft 18 may be restricted by having a predetermined substance (e.g., media) or filling 24 within the interior space of the stir shaft. The predetermined substance may optionally have associated therewith a partial pressure of hydrogen that is at least about the same as the partial pressure of hydrogen associated with the molten glass 16 being stirred within the stirring chamber 10. The predetermined substance may be a solid, liquid or gas, as will be discussed in greater detail below. More specifically and in one example, the partial pressure of hydrogen provided by the filling 24 at the face-to-face contact between the filling and the inner surface of the tubular stir shaft 18 may be at least about the same as any partial pressure of hydrogen provided by the molten glass 16 at the face-to-face contact between the molten glass and the outer surface of the stir shaft, as will be discussed in greater detail below.

As shown in FIG. 1, the upper end of the tubular stir shaft 18 may extend out of the stirring chamber 10 through an upper opening of the stirring chamber. The upper end of the stir shaft 18 may be rotatably mounted to, or rotatably mounted proximate to, the upper opening of the stirring chamber 10 in any suitable manner, such as a conventional manner. A conventional actuator system may be provided for rotating the stir shaft 18 relative to the stirring chamber 10, for mixing the molten glass 16 within the stir chamber. The actuator system may include a conventional motor 28, wherein the rotational output of the motor may be transferred to the stir shaft 18 by a conventional drive 30 that may include one or more of an endless chain, belt, sprockets, pulleys, gears and/or the like. The stir shaft 18 may be rotatably mounted by way of the conventional drive 30. Regarding the conventional drive 30, the top of the stir shaft 18 may be connected by a coupler to a vertical shaft with a gear that is turned by the output of the motor 28.

In the embodiment illustrated in FIG. 1, the lower end of the tubular stir shaft 18 may optionally be completely closed in a conventional manner, such as by a lower end wall 32, which may be in the form of a plug, or any other suitable structure. Each of the stir shaft 18, lower end wall 32 and stirring elements 22 may comprise, consist essentially of, or consist solely of noble metal, such as, but not limited to, platinum (e.g., a platinum alloy). Other suitable noble metals may include Ir, Re, Rh, Pd, Au, Re, Os. In one embodiment, the filling 24, such as a glass filling, is contained within a lower length L of the stir shaft's interior space that extends upwardly from the lower end wall 32 to an upper surface 34 of the glass filling 24. The glass filling 24 is typically molten while the glass manufacturing system is operating in a manner such that a sufficient level of the molten glass 16 is contained in the stirring chamber 10.

As shown in FIG. 1, the upper surface 34 of the glass filling 24 is above the upper surface 36 of the molten glass 16 within the stir chamber. The upper surface 34 of the glass filling 24 is typically at least as high as the upper surface 36 of the molten glass 16 being stirred in the stirring chamber 10. As an alternative to what is shown in FIG. 1, the upper surface 34 of the glass filling 24 may be closer to or optionally in face-to-face contact with an optional upper end wall 38 of the stir shaft 18. As another alternative, the upper surfaces 34, 36 may be at, or about at, the same level as one another, as will be discussed in greater detail below.

For example, the glass filling 24 may comprise, consist essentially of, or consist solely of any glass that will be of sufficiently low viscosity to substantially fill the lower length L of the interior space of the tubular stir shaft 18 with minimal void formation. Optionally, the glass filling 24 may have a higher Beta-OH than the molten glass 16 being processed. Beta-OH may be characterized as being a surrogate measure of the amount of water in the glass, which is proportional to the partial pressure of hydrogen in the glass. Stated differently, beta-OH may be characterized being a measure of the hydroxyl content in the glass, which may be measured by infrared spectroscopy. A glass with a higher Beta-OH should have associated therewith a higher partial pressure of hydrogen than a lower Beta-OH glass. By placing a glass with a higher Beta-OH in the interior space of the stir shaft 18, a flux of hydrogen through the wall of the stir shaft and into the molten glass 16 being processed may be established, for suppressing any oxygen blister formation in the molten glass 16 at the outer surface of the stir shaft.

The filling 24 may be provided in the interior space of the tubular stir shaft 18 in any suitable manner, such as by putting a cored cylinder of glass in the interior space of the stir shaft 18 as the stirrer 20 is being fabricated. As another example, powdered cullet may be poured inside the interior space of the stir shaft 18 as the stirrer 20 is being fabricated, or the powdered cullet may be poured inside the interior space of the stir shaft after the stirrer is installed, perhaps even while the glass manufacturing system is operating, and the powdered cullet may melt within the interior space of the stir shaft. Alternatively, the filling 24 may comprise, consist essentially of, or consist solely of any suitable material, such as a refractory oxide or metal, for decreasing any inward hydrogen permeation through the stir shaft 18. In these embodiments, the filling 24 is isolated from the molten glass in the stifling chamber 10 by the wall of the stir shaft 18, preventing the filling 24 from mixing with the molten glass 16, such as when holes 40 (shown in phantom in FIG. 1 to indicate that the holes are optional) are omitted from the wall of the stir shaft 18.

In another example, the glass filling 24 may be introduced in situ, wherein there may optionally be one or more holes 40 (e.g., small holes) that extend through the sidewall of the stir shaft 18 for allowing the molten glass 16 being processed to seep or flow through the holes into the interior space of the stir shaft to form the filling 24, so that the molten glass 16 being processed and the glass of the filling 24 are the same (e.g., substantially similar). In this regard, examples of such holes 40 extending through the wall of the stir shaft 18 are schematically illustrated by dashed lines in FIG. 1. Alternatively, one or more of the holes 40 may extend through the lower end wall 32, or the lower end wall may be omitted. When the interior space of the stir shaft 18 is in fluid communication with the interior space of the stirring chamber 10, such as by way of the hole(s) 40, or the like, the upper surface 34 of the glass filling 24 may be at the same level, or at about the same level, as the upper surface 36 of the molten glass 16 within the stirring chamber 10. Alternatively, the filling 24 may comprise, consist essentially of, or consist solely of any suitable material, such as a refractory oxide or metal, for decreasing any inward hydrogen permeation through the stir shaft 18.

As an example of a method that may be associated with the embodiment shown in FIG. 1, the outer surface of a tubular stir shaft 18 is in face-to-face contact with the molten glass 16 being stirred within the stirring chamber 10, and a lower length "L" of the interior space of the stir shaft extends from the lower end wall 32 to the upper surface 34 of the glass filling 24, the lower length L of the stir shaft's interior space has a volume and a diameter "D" defined between diametrically opposite portions of the inner surface of the stir shaft, the diameter D is smaller than the lower length L, and the glass filling (e.g., the molten (e.g., liquid) glass filling) fills all of (e.g., substantially 100% of) the volume of the lower length L of the stir shaft's interior space that extends from the lower end wall 32 to the upper surface 34 of the glass filling 24. Accordingly and in one embodiment, except perhaps for the upper surface 34 of the glass filling 24, all of the other surfaces of the glass filling may be in face-to-face contact with noble metal of the stirrer 20; and for each of these other surfaces of the glass filling, substantially all of the surface may be in face-to-face contact with noble metal, such as noble metal of the stir shaft 18 and noble metal of the lower end wall 32.

The glass filling 24 may be thicker than a wall thickness defined between the inner and outer surfaces of the tubular stir shaft 18. The glass may extend substantially continuously across the diameter D of the lower length L of the stir shaft's interior space, from one of the diametrically opposite portions of the inner surface of the stir shaft 18 to the other of the diametrically opposite portions of the inner surface of the stir shaft, and the glass filling may be in face-to-face contact with each of the diametrically opposite portions of the inner surface of the stir shaft. The diameter D of the lower length L of the stir shaft's interior space may be the inner diameter of the stir shaft 18.

The diameter D may be more generally referred to as a maximal crosswise dimension. For example, whereas the tubular stir shaft 18 may be a cylindrical tube, the tubular stir shaft may be in other suitable configurations such as, but not limited to, in the form of triangular or other suitably shaped tubes.

In accordance with one aspect of this disclosure, the glass filling 24 may fill the entire volume (e.g., substantially the entire volume) of the lower length L of the stir shaft's interior space that extends from the lower end wall 32 to the upper surface 34 of the glass filling, so that only (e.g., substantially only) glass of the glass filling is present in the lower length L of the stir shaft's interior space that extends from the lower end wall 32 to the upper surface 34 of the glass filling. In this regard, it may be advantageous to omit refractory materials, such as silicate and/or alumina based ceramic materials (e.g., $SiO_2$ ceramic material), from the interior space of the stir shaft 18 because the glass filling 24 may corrode the refractory materials. Alternatively, the glass filling 24 may fill less than the entire volume of the lower length L of the stir shaft's interior space that extends from the lower end wall 32 to the upper surface 34 of the glass filling. For example, when the glass filling 24 is in the form of cullet that has not yet been melted, there may be voids between adjacent pieces of the cullet and/or the article may be something other than a tubular stir shaft 18, such as, but not limited to, a level probe, bell or bell shaft (e.g., for use in forming glass tubing), thermocouple sheath, or the like. For example, the glass filling 24 may occupy only a portion of the volume of the lower length L of the article or stir shaft's interior space that extends from the lower end wall 32 to the upper surface 34 of the glass filling, such as at least about 33% of that volume, at least about 50% of that volume, at least about 75% of that volume, at least 90% of that volume, at least about 98% of that volume and/or any other suitable amount.

Figure 2:
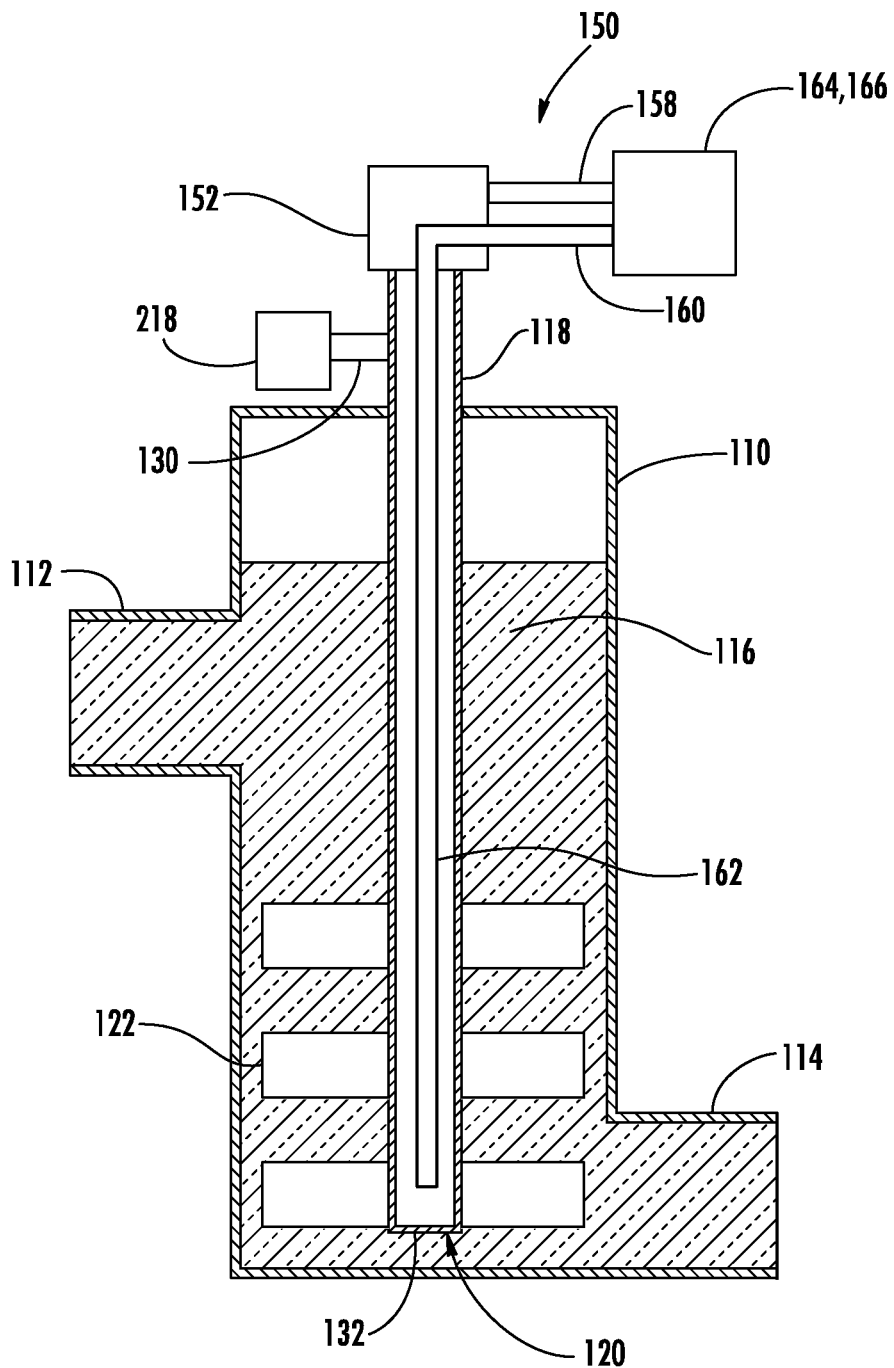
FIG. 2 is a schematic, side cross-sectional view of a stir chamber and a few other features of a glass manufacturing system, in accordance with another embodiment.
Figure 3:
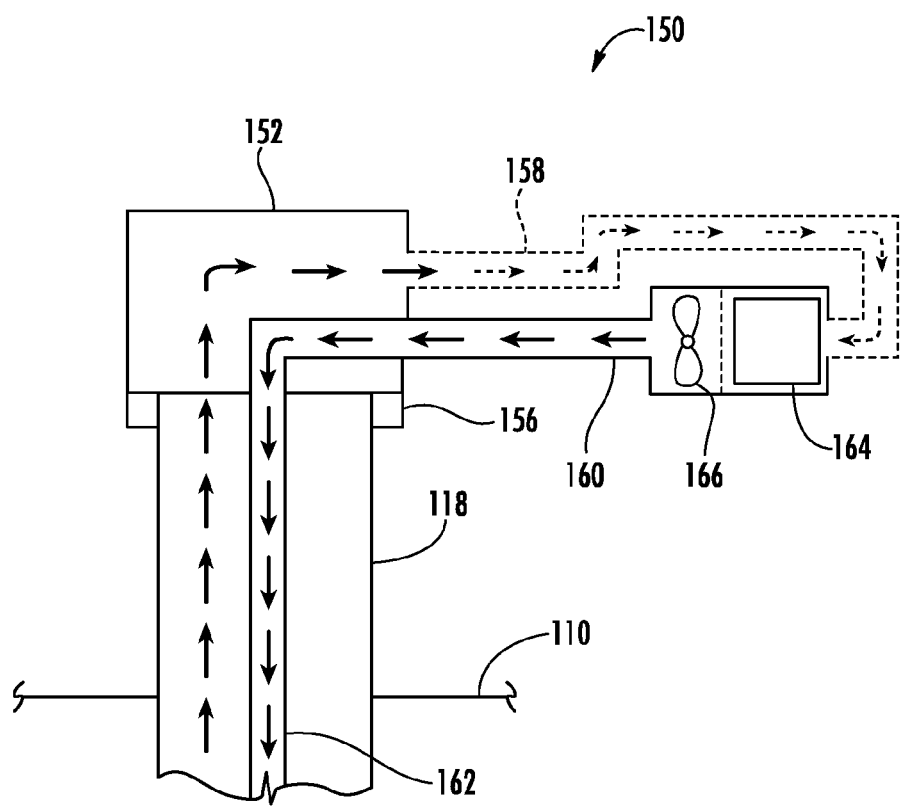
FIG. 3 is a schematic, cross-sectional view that illustrates a portion of FIG. 2 in greater detail, in accordance with an embodiment.

The embodiment illustrated in FIG. 2 is like the embodiment illustrated in FIG. 1, except for variations noted and variations that will be apparent to one of ordinary skill in the art. Due to the similarity, components that are identical, similar and/or function in at least some ways similarly have reference numbers incremented by 100. Referring to FIG. 2, the stirring chamber 110 may include an inlet and outlet 112, 114 by way of which the interior of the stirring chamber may be in fluid communication respectively with the finer tube and the delivery vessel of the glass manufacturing system. The stirrer 120 may include one or more stirring elements 122, such as blades or any other suitable features, that may be fixedly connected to and extend outwardly from the lower end of the tubular stir shaft 118 that is submersed in the molten glass 116 within the stifling chamber 110. The upper end of the stir shaft 118 may be rotatably mounted to, or rotatably mounted proximate to, the upper opening of the stirring chamber 110 in any suitable manner, such as by way of one or more rotary bearings 156 (as depicted in FIG. 3). The stir shaft 118 may be rotatably driven by a motor 218, by way of a suitable drive 130. The lower end of the tubular stir shaft 118 is closed, such as by the lower end wall 132.

In accordance with the embodiment illustrated in FIG. 2, the glass filling 24 and hole(s) 40 of FIG. 1 are typically omitted from the stirrer 120. More specifically, tubular stir shaft 118 typically includes neither the glass filling 24 nor the hole(s) 40 that are shown in FIG. 1.

Referring to FIG. 2, the stirrer 120 includes or has associated therewith a control system 150 for controlling the fluid (e.g., atmosphere) in the interior space of the tubular stir shaft 118, so that the controlled fluid within the stir shaft's interior space has associated therewith a partial pressure of hydrogen that is at least about the same as any partial pressure of hydrogen provided by the molten glass 116 at the interface between the molten glass 116 and the outer surface of the stir shaft 118. The control system 150 may be configured for causing the controlled fluid to flow within the interior space of the tubular stir shaft 118. As a more specific example that will be discussed in greater detail below, the control system 150 may optionally be a closed-loop control system that circulates, or more specifically recirculates, the controlled fluid within the interior space of the tubular stir shaft 118. The controlled fluid may be, for example, gas or air having sufficient humidity so that the controlled atmosphere within the interior space of the stir shaft 118 has a partial pressure of hydrogen that is at least about the same as the partial pressure of hydrogen associated with the molten glass 116 being stirred within the stirring chamber 110. Other suitable fluids, such as gasses, may be introduced into, or more specifically circulated within, the interior space of the tubular stir shaft 118, as will be discussed in greater detail below.

Referring to FIG. 3, the control system 150 may include a coupler 152, and the coupler may be mounted to and obstruct the upper end of the stir shaft 118 in any suitable manner. For example, this mounting may be facilitated through the use or one or more rotary bearings 156. The bearings 156 may be mounted and cooperatively configured for allowing the stir shaft 118 to rotate relative to both the stirring chamber 110 and the coupler 152. The coupler 152 may be connected to a frame (not shown) or other suitable features for preventing or otherwise restricting any relative rotation between the coupler and the stirring chamber 110.

The coupler 152 may be in the form of a downwardly open chamber, so that the coupler includes a lower opening. The lower opening of the coupler 152 may be open to the upper end of tubular stir shaft 118, so that there is open fluid communication between the interior space of the stir shaft and the interior space of the coupler. The coupler 152 may include, have connected thereto, or otherwise be associated with one or more passageways 158, 160, 162 (e.g., tubes or other suitable conduits) of the control system 150. For example, an upstream passageway 158 may be connected between the coupler 152 and a conditioning unit 164 of the control system 150, for providing fluid communication between the interior space of the coupler and the conditioning unit. The conditioning unit 164 may include or be associated with one or more motor-driven pumps 166 (e.g., fan(s)) for moving the circulated liquid (e.g., gas) through the control system 150 and the interior space of the stir shaft 118. The pump 166 may be mounted to or otherwise in fluid communication with the conditioning unit 164. An intermediate passageway 160 may be connected between the pump 166 and the coupler 152, and a downstream passageway 162 may be connected to the intermediate passageway for providing fluid communication between the pump and a lower portion of the interior space of the stir shaft 118. That is, the downstream passageway 162 may extend downwardly into the interior space of the stir shaft 118. More specifically, the downstream passageway 162 may extend coaxially downwardly into the interior space of the stir shaft 118, and the outer diameter of the downstream passageway 162 may be smaller than the inner diameter D of the tubular stir shaft 118.

As schematically partially shown by the series of arrows in FIG. 3, the closed-loop control system 150 may circulate the controlled fluid through the interior space of the stir shaft 118 by discharging the controlled fluid from the lower end of the downstream passageway 162 into the lower end of stir shaft's interior space, and drawing the controlled fluid out of the upper end of the stir shaft's interior space through the coupler 152 and into an upstream end of the upstream passageway 158. Alternatively, the controlled fluid may flow in the opposite direction, and any other suitable coupler 152, passageways 158, 160, 162, pump 166 and conditioning unit 164 may be used, and these features may be arranged in any other suitable manner. As another example and as schematically shown by the dashed lines in FIG. 3, the upstream passageway 158 or a portion thereof may be omitted, or the control system 150 may be otherwise configured so that the control system does not form a closed loop. For example, in some situations, such as when the controlled fluid may be humid air, or the like, the coupler 152 may be configured injecting the controlled fluid into the interior space of the stir shaft 118, such as by way of the downstream passageway 162, and the upper end of the interior space of the stir shaft may be open to the ambient atmosphere so that the controlled fluid is exhausted from the interior space of the stir shaft to the ambient atmosphere. For example, the control system 150 may be configured for filling the interior space of the stir shaft 118 with the controlled fluid and/or purging the interior space of the stir shaft with the controlled fluid.

As one example, the conditioning unit 164 may be or may include a humidifier. As another example, the conditioning unit 164 may include a variety of features that may be variously arranged within the control system 150. For example, the control system 150 may provide (e.g., circulate) a humid, low oxygen atmosphere within the interior space of the stir shaft 118. In this regard, the conditioning unit 164 may provide a mixture of water vapor, oxygen and nitrogen (or another inert gas like argon or helium). In this regard, the closed-loop control system 150 may include a computerized controller that obtains sensor readings from one or more locations within the control system. The sensors may include one or more of each of a flow sensor, dew point/humidity sensor, temperature sensor, oxygen sensor, and pressure sensor. The computerized controller may processes the sensor measurements and control different features of the conditioning unit 164, such as a humidity feed system, a heating/cooling control system, the pump(s) 166 and an $O_2/N_2$ makeup system. The pump(s) 166 may have access to a process gas such as air, steam and/or any other suitable material. In operation, the computerized controller, or the like, controls the devices of the closed loop control system 150 to create an environment/atmosphere inside the interior space of the stir shaft 118 that has a partial pressure of hydrogen that is at least about the same as, or greater than, the partial pressure of hydrogen associated with the molten glass 116 being stirred within the stirring chamber 110. The control system 150 may include suitable features and operations described in U.S. Pat. No. 7,628,038, the entire disclosure of which has already been incorporated herein by reference.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for processing a first molten glass, comprising:
   having face-to-face contact between the first molten glass and an outer surface of an article comprising a noble metal, wherein the article has an inner surface that is opposite the outer surface, the inner surface extends around an interior space of the article, an entire length of the interior space has a volume and a crosswise dimension defined between opposite portions of the inner surface of the article, the crosswise dimension being smaller than the length, and wherein a wall thickness of the article is defined between the inner and outer surfaces of the article; and
   restricting any inward hydrogen permeation through a wall of the article, comprising having a filling material comprising a second molten glass different from the first molten glass, the second molten glass disposed in the length of the interior space so that the filling material is in face-to-face contact with the inner surface of the article and the filling material fills at least about 33% of the volume of the length of the interior space, wherein the filling material is isolated from the first molten glass by the wall of the article and the filling material is effective for restricting any inward hydrogen permeation through the wall of the article.

2. The method according to claim 1, wherein the restricting of any inward hydrogen permeation through the wall of the article comprises:
   the filling material providing a partial pressure of hydrogen at the face-to-face contact between the inner surface and the filling material; and
   wherein the partial pressure of hydrogen provided by the filling material at the face-to-face contact between the inner surface and the filling material is at least about the same as any partial pressure of hydrogen at the face-to-face contact between the outer surface and the first molten glass.

3. The method according to claim 1, further comprising:
   at least partially containing the first molten glass in a stirring chamber; and
   stirring the molten class in the stirring chamber, the stirring comprising rotating the article in the stirring chamber, wherein the article is a tubular stir shaft and at least one stirring element extends outwardly from the tubular stir shaft.

4. The method according to claim 1, wherein:
   the second molten glass disposed in the length of the interior space has a first Beta-OH, and
   the first molten glass in contact with the outer surface of the article has a second Beta-OH that is less than the first Beta-OH.

5. The method according to claim 1, wherein the filling material has an upper surface and other surfaces, and all of the other surfaces are in face-to-face contact with noble metal.

* * * * *